(12) United States Patent
Han (10) Patent No.: US 10,813,175 B2
(45) Date of Patent: Oct. 20, 2020

(54) DEFROSTING INFRARED WINDOWS USING TRANSPARENT METALLIC NANOSTRUCTURES

(71) Applicant: STC.UNM, Albuquerque, NM (US)

(72) Inventor: Sang Eon Han, Albuquerque, NM (US)

(73) Assignee: UNM Rainforest Innovations, Albuquerque, NM (US)

( * ) Notice: Subject to any disclaimer, the term of this patent is extended or adjusted under 35 U.S.C. 154(b) by 327 days.

(21) Appl. No.: 15/736,534

(22) PCT Filed: Jun. 15, 2016

(86) PCT No.: PCT/US2016/037490
§ 371 (c)(1),
(2) Date: Dec. 14, 2017

(87) PCT Pub. No.: WO2016/205273
PCT Pub. Date: Dec. 22, 2016

(65) Prior Publication Data
US 2018/0359815 A1 Dec. 13, 2018

Related U.S. Application Data

(60) Provisional application No. 62/175,758, filed on Jun. 15, 2015.

(51) Int. Cl.
*H05B 3/84* (2006.01)
*G02B 1/18* (2015.01)
*B82Y 30/00* (2011.01)

(52) U.S. Cl.
CPC ............... *H05B 3/84* (2013.01); *B82Y 30/00* (2013.01); *G02B 1/18* (2015.01); *H05B 2214/04* (2013.01)

(58) Field of Classification Search
CPC ........................................................ H05B 3/84
USPC ......................................... 219/138–480, 203
See application file for complete search history.

(56) References Cited

U.S. PATENT DOCUMENTS 4,286,266 A 8/1981 De Zwart et al.

OTHER PUBLICATIONS

Russian International Searching Authority; International Search Report & Written Opinion for PCT/US2016/037490; dated Aug. 18, 2016; 7 pages; Moscow, RU.

(Continued)

*Primary Examiner* — Lori L Baker
(74) *Attorney, Agent, or Firm* — Keith Vogt, Ltd.; Keith A. Vogt (57) ABSTRACT

An optoelectronic device having a self-defrosting/de-icing window configured to operate at an electromagnetic radiation frequency having metals that are optically transparent as a result of the wires having an effective plasma frequency that is equal to or lower than the electromagnetic frequency at which the device operates. The effective plasma frequency of the wire is lowered by configuring the path of the wire between the terminal ends to be meandering, serpentine, U-shaped and in other non-linear configurations. The metal wires are resistively heated.

19 Claims, 5 Drawing Sheets

(56) References Cited

OTHER PUBLICATIONS

Langley et al; Flexible transparent conductive materials based on silver nanowire networks: a review; Nanotechnology 24 (2013); 4 pages.
Voronin et al; Transparentir colloid networks substrate heaters using sol-gel lithography; Yademaya i alternativnaya energetika, No. 4 (10) oktyabr-dekabr 2014. 4 pages.
Kottmann et al; Plasmon resonances of silver nanowires with a nonregular cross section; Physical review b., vol. 64, 2001; 235402; 2 pages.
Gao et al; The role of propagating modes in silver nanowire arrays for transparent electrodes; Optics Express A 419, vol. 21, No. S3, 2013; 2 pages.

DEFROSTING INFRARED WINDOWS USING TRANSPARENT METALLIC NANOSTRUCTURES

RELATED APPLICATIONS

This application claims the benefit of U.S. Provisional Application No. 62/175,758 filed Jun. 15, 2015 and herein incorporated by reference.

STATEMENT REGARDING FEDERALLY SPONSORED RESEARCH & DEVELOPMENT

Not applicable.

INCORPORATION BY REFERENCE OF MATERIAL SUBMITTED ON A COMPACT DISC

Not applicable.

BACKGROUND OF THE INVENTION

Infrared detectors react to infrared (IR) radiation. The two main types of detectors are thermal and photonic (photodetectors). Infrared cameras or thermal imaging cameras are devices that form an image using infrared radiation, similar to a common camera, that forms an image by operating in wavelengths as long as 14,000 nm (14 µm). IR devices are continuing to find uses in a wide range of applications including in harsh environments in which a lens or window used by the IR device to receive IR may become obscured by ice or frost.

While external deicing (heating) systems may be used, such systems add to the complexity and cost of the IR device. Thus, there is a need to provide deicing capabilities within the window/lens itself while not inhibiting the ability to have IR pass through the window, lens or transparent material unobstructed.

It is known from the microwave circuit theory that an inductor subjected to an oscillating field suppresses Joule heat dissipation at high frequencies. This suggests that the metal loss in IR applications may be suppressed by increasing the Faraday inductance of the metal structures. Moreover, metals can be nanostructured such that electric current can flow in tortuous paths. In this case, the effective conductivity would be small with the result that metal loss is suppressed. However, these two effects are valid when the metal structures are much smaller than the wavelength of light. When the light wavelength becomes comparable to the size of the metal structures, typically strong resonant absorption peaks arise due to optical interference.

BRIEF SUMMARY OF THE INVENTION

In one embodiment, the present invention shows that parasitic absorption in metal nanostructures can be significantly reduced over a broad band by increasing the Faraday inductance and the electron path length. For an example structure, the loss is reduced in comparison to flat films by more than an order of magnitude over most of the very broad spectrum between short and long wavelength infrared. For a photodetector structure, the fraction of absorption in the photoactive material increases by two orders of magnitude and the photoresponsivity increases by 15 times because of the selective suppression of metal absorption. As a result, this embodiment of the present invention could benefit many metal-based applications that require low loss such as photovoltaics, photoconductive detectors, solar selective surfaces, infrared-transparent defrosting windows, and other metamaterials. In addition, the present invention would be suitable for use in any material that needs to be IR transparent yet still contain metal structures, wiring or conductors therein. Suitable structures for creating transparent arrays are set forth in U.S. Pat. No. 9,246,031 to Han et al., the disclosure of which is hereby incorporated by reference in its entirety.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

In the drawings, which are not necessarily drawn to scale, like numerals may describe substantially similar components throughout the several views. Like numerals having different letter suffixes may represent different instances of substantially similar components. The drawings illustrate generally, by way of example, but not by way of limitation, a detailed description of certain embodiments discussed in the present document.

DETAILED DESCRIPTION OF THE INVENTION

Detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a representative basis for teaching one skilled in the art to variously employ the present invention in virtually any appropriately detailed method, structure or system. Further, the terms and phrases used herein are not intended to be limiting, but rather to provide an understandable description of the invention.

Figure 1:
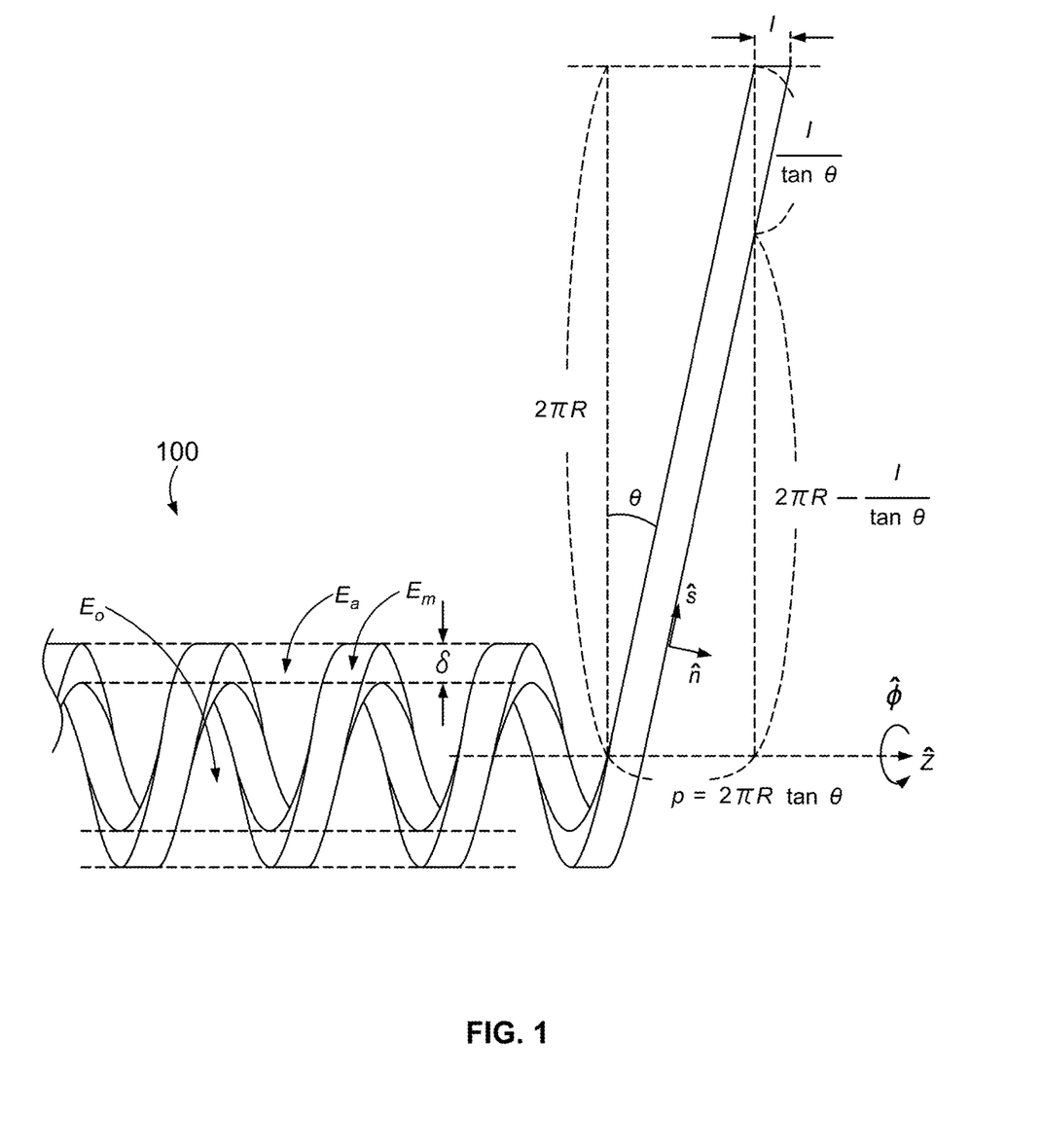
FIG. 1 illustrates a nanocoil with geometrical parameters, cylindrical coordinates, tangential and normal vectors ($\hat{s}$ and $\hat{n}$) as well as electric fields.

A monolayer array of metal nanocoils is shown in FIG. 1. This structure allows for optical modeling from which the underlying physics of loss suppression can be captured. The nanowire is helically wound with an outer radius R and a pitch p with a winding angle θ. It has a rectangular cross-section with a width l cos θ and a thickness δ. The nanocoils form an array which, may be a periodic monolayer array, with the distance between the neighboring nanocoil axes equal to a and light polarized in the $\hat{z}$ direction is incident in the direction normal to the monolayer surface. This polarization was focused on because the loss part of the effective dielectric function for metal nanostructures is in general maximized when light moves the electrons in the same direction as the polarization at long wavelengths of light.

Referring to FIG. 1, it is shown that the electron path length in a nanocoil per unit length in the coil axis direction $\hat{z}$ is longer than a straight nanowire aligned along the same direction by a factor of $$\eta = \frac{2\pi R / \cos\theta}{p} = \frac{1}{\sin\theta}. \tag{1}$$

The Faraday inductance per unit z-direction length of the nanocoil is given by $$L = \frac{\mu_0}{4\pi \tan^2 \theta}, \tag{2}$$

where $\mu_0$ is the vacuum permeability. While both η and L are determined by θ, the L effect on absorption can be distinguished from the η effect because only the Faraday inductance L appears as a product with the angular frequency ω in later equations. The metal filling fraction in the nanocoil array is $$f = \frac{\delta l}{a^2 \tan\theta}\left(1 - \frac{\delta}{2R}\right). \tag{3}$$

The optical properties of the nanocoil array may be described in terms of the three geometric parameters in equations (1)-(3). Modeling predicts that, when θ and f are small, the absorptance A of the nanocoil array in the quasi-static limit is given by $$A \simeq \frac{\omega a}{c}\varepsilon''_m f \left|\frac{1}{\eta - \frac{i\omega\delta l\sigma_0}{1 - i\omega\tau}L}\right|^2, \tag{4}$$

where $\varepsilon''_m$ is the imaginary part of the metal dielectric function, c is the speed of light, $\sigma_0$ is the DC conductivity, and T is the relaxation time of the metal in the Drude model.

Equation (4) shows that absorption decreases as the electron path length and the Faraday inductance increase. In particular, according to equation (4), the role of the Faraday inductance in decreasing absorption is appreciable only at high frequencies.

The absorption decrease is directly related to the effective dielectric function $\varepsilon_{eff}$ of the nanocoil array. By definition, $\varepsilon_{eff}=1+\sigma_{eff}/(\varepsilon_0\omega)$, where $\sigma_{eff}$ is the effective conductivity. When $|\varepsilon_m|$ is large, the $\sigma_{eff}$ is $$\sigma_{eff} \simeq \frac{f\sigma_0}{\eta^2}\frac{1}{1 - i\omega\tau_{eff}}, \tag{5}$$

where the effective relaxation time $\tau_{eff}$ is defined as $$\tau_{eff} \equiv \tau + \delta l\sigma_0\sqrt{\frac{\mu_0 L}{4\pi}}. \tag{6}$$

In equation (5), it is shown that $\sigma_{eff}$ is inversely proportional to $\eta^2$. Thus, by elongating the electron path, embodiments of the present invention can decrease the effective conductivity and hence decrease the metal loss rendering the metal nearly transparent to IR. This means that the metal will not interfere with the IR passing through the metal, wire or conductor inside or attached to an IR transparent material such as a window and/or lens.

Equation (6) reveals that the electron relaxation time increases as the Faraday inductance increases. This increased electron collision time results in absorption reduction as predicted in equation (4).

Figure 2A:
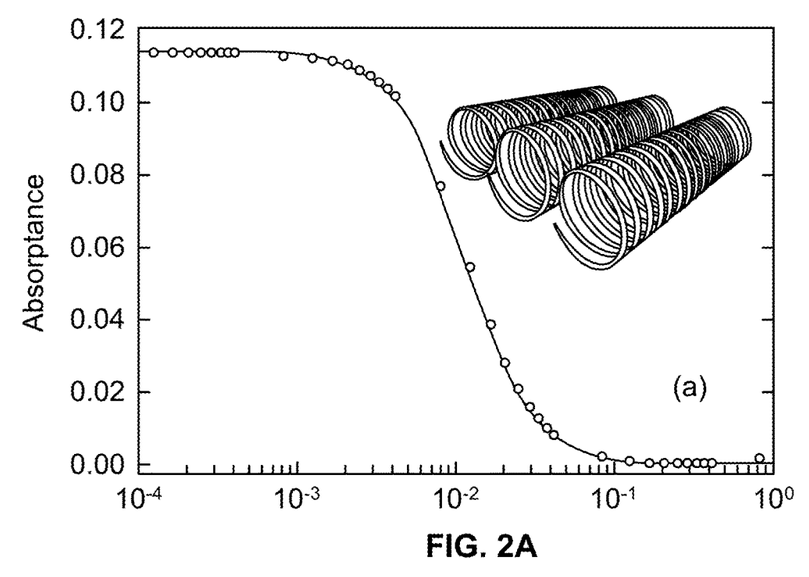
FIG. 2A provides numerical solutions (solid circles) and model predictions (solid line) of absorptance.
Figure 2B:
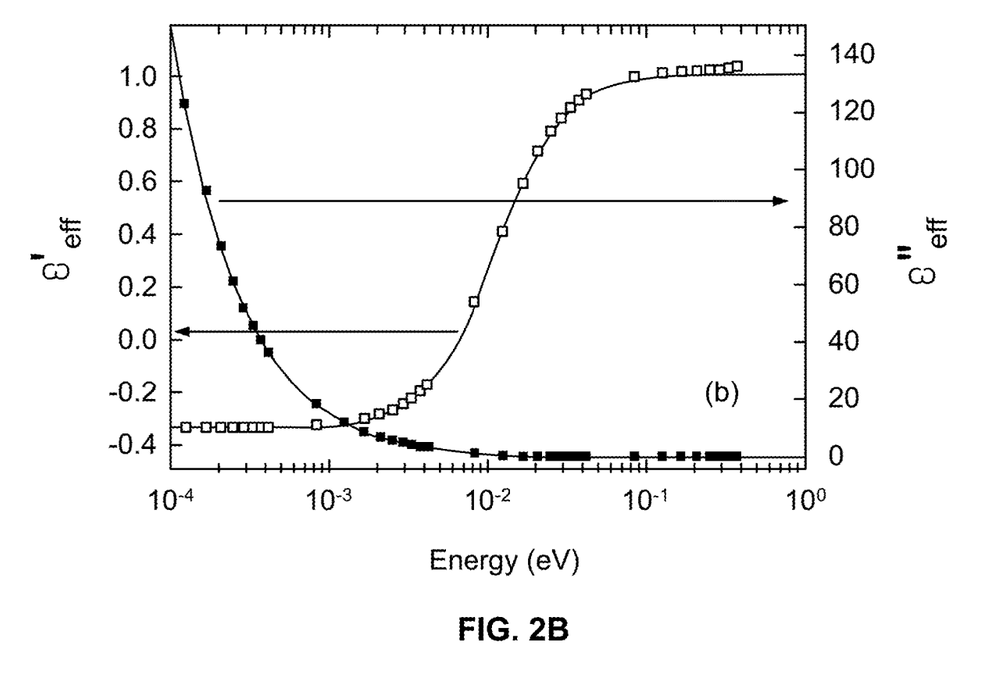
FIG. 2B provides numerical solutions (open square for the real part and solid square for the imaginary part of effective dielectric function ($\varepsilon_{eff}$) and model predictions (solid line) of $\varepsilon_{eff}$ for the nanocoil array as a function of photon energy.

FIG. 2 shows a comparison of the absorptance A and the effective dielectric function $\varepsilon_{eff}$ for an aluminum nanocoil array between the numerical solutions and the model predictions based on equations (4) and (5). The reflectance of the nanocoil array is negligible compared to the absorptance. The dielectric function of aluminum was modeled by $\hbar/\tau=0.05307$ eV and $\hbar\omega_p=12$ eV where $\omega_p$ is the plasma frequency. For accurate calculations, the present invention used the finite element method with a nonuniform mesh concentrated in the metal. The effective dielectric function was extracted from the numerical calculations. The model predictions agree well with numerical solutions for both A and $\varepsilon_{eff}$. The effective dielectric function exhibits the typical behavior of a Drude metal with a low effective plasma frequency $\omega_{p,\ eff}$ corresponding to 6 meV in photon energy. When the energy is above ~0.1 eV, the A approaches zero and the $\varepsilon_{eff}$ close to the dielectric function of vacuum. This low loss of the structure at high frequencies is the consequence of the combined effect of a large Faraday inductance and a long electron path as the model demonstrates. The loss suppression effect is remarkable because, according to calculations with actual Al dielectric function, $\varepsilon''_{eff}$ at $\varepsilon'_{eff}=1$ is only 0.0056 which is even smaller than $\varepsilon''_m=0.0080$ at $\varepsilon'_m=1$ which happens at a high photon energy of 66 eV. This means that the loss of the structured metal at the transparent region is even smaller than that of the bulk metal at the higher energy.

Compared to a flat film, the nanocoil structure reduces absorption by more than an order of magnitude over most of the very broad spectrum between short (~1.2 μm) and long wavelength (~20 μm) infrared. The loss suppression in metal by nanostructuring translates to the reduction in thermal emission by Kirchhoff's law. However, as the frequency becomes higher (>1 eV) and approaches the diffraction limit i.e. $\omega \sim 2\pi c/a$, the absorptance of the nanocoil structure becomes significant. This behavior would be useful for solar selective surfaces that should absorb sun light strongly and suppress the heat loss that occurs through thermal radiation. Because the thermal radiation from the selective surfaces is typically in the mid- to near-IR range, the nanocoil array suppresses the radiation loss significantly.

The Faraday inductance opposes a change in the movement of the conduction electron in the metal nanocoil and the electron in the structure behaves as if its mass, m, is enhanced. Moreover, the electronic movement in the direction of the nanocoil axis ($\hat{z}$) is retarded by the geometry of the nanocoil because the nanowire is not aligned along the $\hat{z}$ direction. These two effects enhance the effective mass, $m_{eff}$, of an electron in the nanocoil. The enhancement factor of the electron mass is $$\frac{m_{eff}}{m} = \eta^2 \frac{\tau_{eff}}{\tau}. \tag{7}$$

For structure shown in FIG. 2, $m_{eff}/m$ is evaluated to be ~4600 so that the electron is effectively heavier than a hydrogen molecule ($H_2$). When $\omega\tau \gg 1$, the loss suppression factor $\varepsilon''_{eff}/\varepsilon''_m$ is related to the mass enhancement factor by $$\frac{\varepsilon''_{eff}}{\varepsilon''_m} = f \frac{\tau}{\tau_{eff}} \frac{m}{m_{eff}}. \tag{8}$$

This factor is independent of the frequency as long as $\omega\tau \gg 1$. In addition to the mass enhancement effect, the reduction in the effective density of electrons by decreasing the metal filling fraction f reduces the loss as equation (4) shows. However, the filling fraction effect alone cannot achieve the dramatic change in the optical properties of structured metals. While the nanocoil array is highly transparent, the nanotube array behaves like a typical metal below the plasma frequency. The loss suppression of the nanocoil array is remarkably insensitive to the incidence angle at least up to 60° when the E-field is parallel to the coil axes. As the E-field direction deviates in an off-normal incidence, the spectral window of loss suppression narrows because of the high energy resonance tail.

Figure 3A:
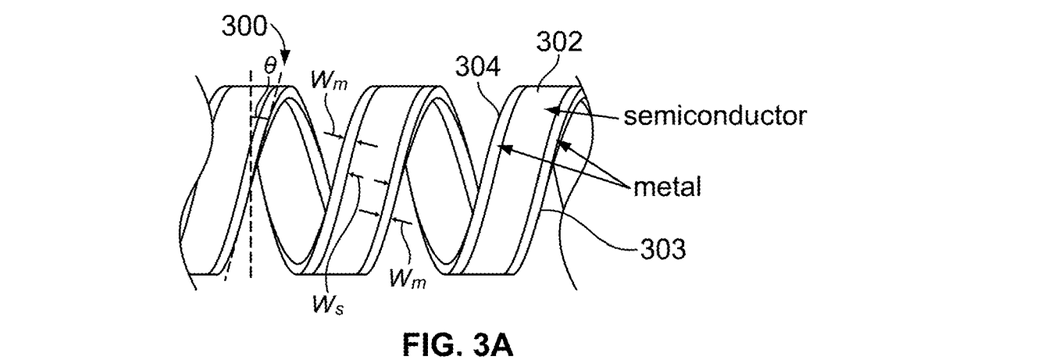
FIG. 3A is a schematic of a coiled metal strip that has transparent properties.

The effect of loss suppression in metals is useful in IR detectors for which metal electrodes are widely used. An example structure where metal nonlinear structures such as nanoribbons are curled into nanocoils is shown in FIG. 3A. Resistive heating may be created by applying a current to metal conductors 303 and 304. Alternately, the entire wire 302 may be made of a metal and heating may be performed by applying a current to the conductor at the terminal ends.

Figure 3B:
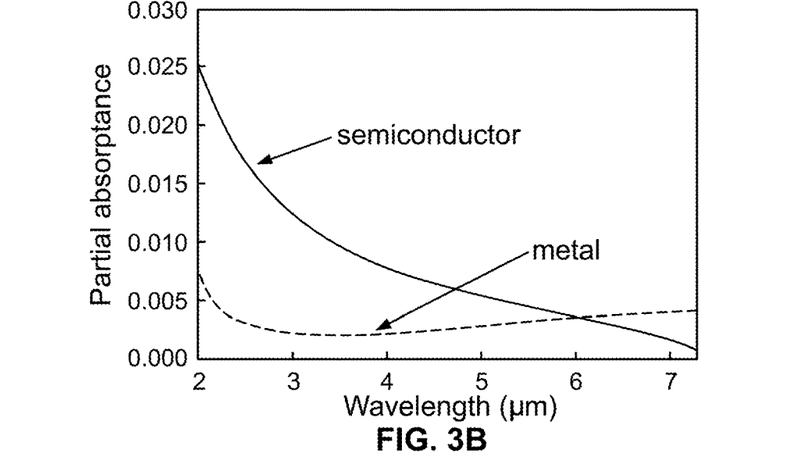
FIG. 3B shows the spectrum of partial absorptance for the monolayer array shown in FIG. 3A.
Figure 3C:
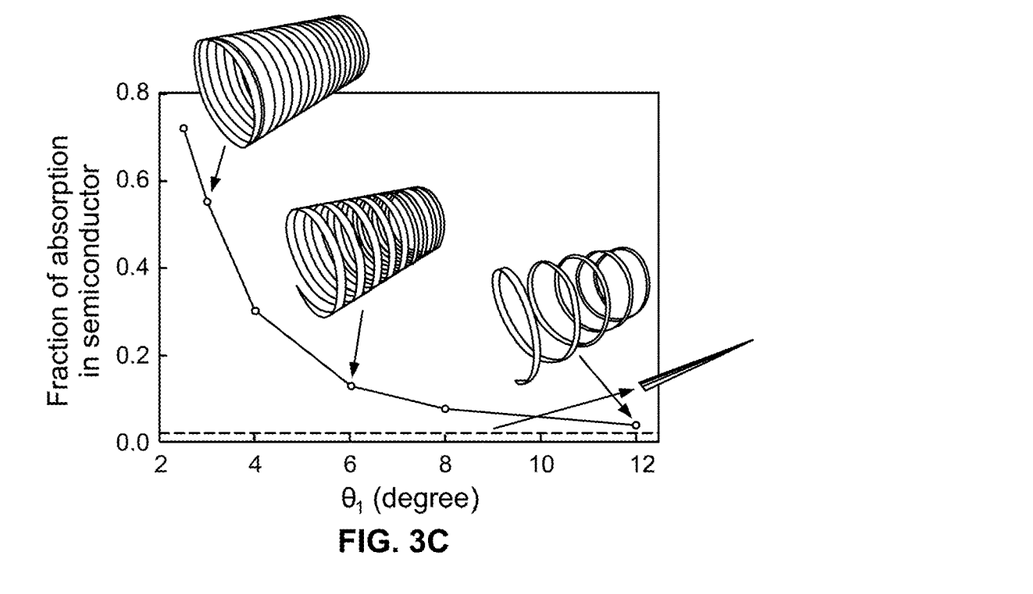
FIG. 3C shows the fraction of absorption in semiconductor, $\rho_s$, as to function of $\theta$ for the nanocoil shown.

The two metal nanowires on both sides of the semiconductor nanostrip are electrodes and the semi-conductor layer is a photoactive material. For the coiled nanoribbon monolayer array, it was calculated that the partial absorptance in semiconductor (InSb) and metal (Ag) when $\theta=2.5°$, and show in FIG. 3B, the resulting spectra above the semiconductor band gap which corresponds to the free photon wavelength of 7.3 μm. The spectra show that the absorption enhancement in semiconductor is over a broad band without any resonant features. Because of the small scale of the structures compared to light wavelength, the excitation of SPPs is negligible and the optical diffraction is almost absent. A useful parameter to characterize the effect of metal loss suppression in IR detectors is the fraction of absorption in semiconductor, $p_s$, defined by $$\rho_s \equiv \frac{\int_{\lambda_{min}}^{\lambda_{max}} A_s d\lambda}{\int_{\lambda_{min}}^{\lambda_{max}} (A_s + A_m) d\lambda}, \tag{9}$$

where $\lambda_{min}=3.5$ μm, $\lambda_{max}=7.3$ μm, and $A_s$ and $A_m$ are partial absorptance in semiconductor and metal, respectively. FIG. 3C shows calculated $\rho_s$ as a function of θ. As θ decreases, the selective suppression of absorption in the metal results in an increased fraction of absorption in the semiconductor. This behavior remains almost the same quantitatively for off-normal incident directions as long as the E-field is parallel to the nanocoil axes.

Compared to a flat strip array with the same periodicity a, the $\rho_s$ of the coiled geometry at θ=2.5° is higher by two orders of magnitude. This result indicates that the control of the Faraday inductance and the electron path length in metal nanostructures in a photodetector would be useful in increasing its efficiency since it renders the metal nearly transparent to the IR.

The loss suppression effect can be probed optically for the metal nanocoil arrays in FIGS. 2 and 3A. For fabrication of the structures, various techniques can be used including direct laser writing, interference lithography, glancing angle deposition, and zinc oxide growth. To determine if IR loss suppression or transparency is realizable, the present invention considered photoconductance measurement on the coiled Ag—InSb—Ag composite nanostrip arrays.

Figure 4A:
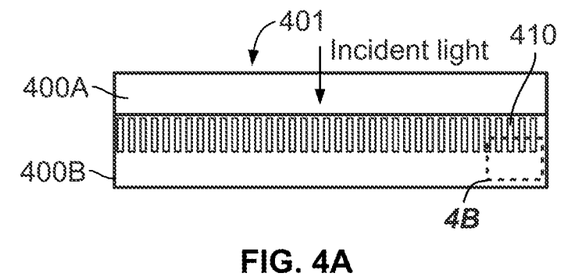
FIG. 4A is a schematic of a coiled metal nanostrip array fabricated by releasing strained strips from mesa lines.
Figure 4B:
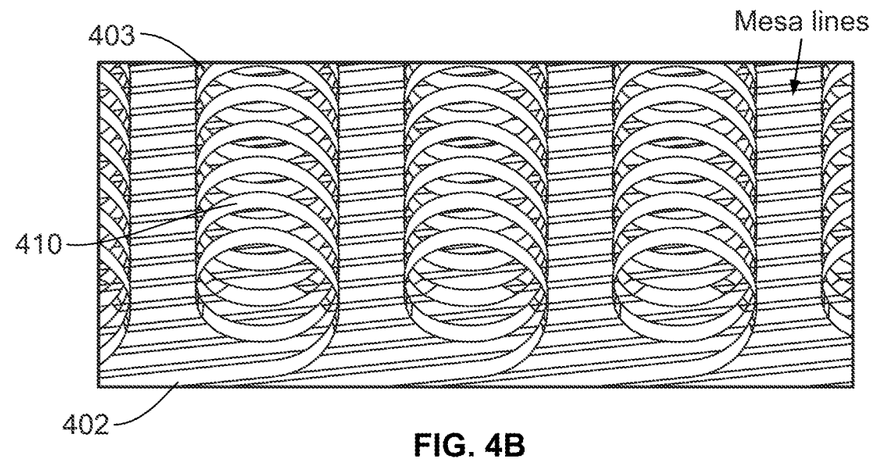
FIG. 4B is a close-up view of the array showing electrical connections to measure photoconductance.

FIGS. 4A and 4B depict another embodiment, the present invention that provides a transparent material 400A and 400B such as a window for use with an optoelectronic device 401 configured to operate at an electromagnetic radiation frequency. The window may be in the form of a composite with layers 400A and 400B with at least one metal wire 410 located between the layers. Alternately, the metal wire 410 may be located in a solid material or located on or near the surface.

Metal wire 410 has an effective plasma frequency when in a linear configuration and an effective plasma frequency greater than electromagnetic frequency at which the device operates. The metal wire when configured in a non-linear configuration has an effective plasma frequency that is equal to or lower than the electromagnetic frequency. The IR transparent window may be defrosted or deiced by having the metal wire resistively heated by passing a current through terminal ends 402 and 403 while maintaining the wire's ability to be optically transparent at the electromagnetic radiation frequency.

Figure 4C:
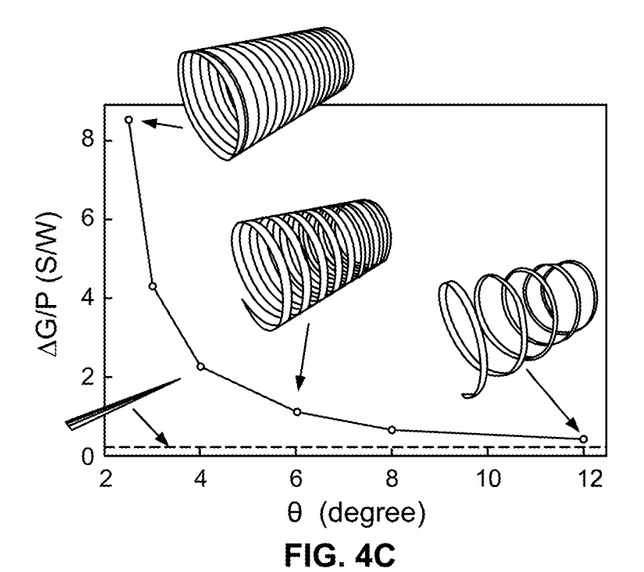
FIG. 4C shows a change in conductance per unit incident power as a function of the coil winding angle at a temperature T=77 K. The light source is a black body at T=500 K that is frequency filtered within 3.5 µm<$\lambda$<7.3 µm. The incident power density is 0.2 W/m². Nanostrips with a length L=200 µm are coiled. The material and structural parameters are the same as in FIG. 3.

The metal structures may be fabricated by methods that use the inherent stress gradient over the nanostrip thickness. The flat strained nanostrips are self-coiled as released from the mesa lines by chemical etching. To control the coiling properties of the Ag—InSb—Ag nanostrips, thin IR transparent nanostrips can be deposited on them before coiling. The Ag nanowires on the right and left side of the nanostrips are connected to two Ag plates separately and the plates may be electrically biased for resistive heating. Light is incident on the structure from the top and the conductance change by irradiation is probed. FIG. 4C shows the change in conductance G per unit incident power P as a function of the coil winding angle. The ΔG/P, which is the photoresponsivity per unit volt, increases as θ decreases and is enhanced by 15 times at θ=2.5° compared to flat strips. Therefore, not only can the loss suppression effect be probed in photoconductivity experiments but also it will be useful in application in which IR transparency is required. The coiling-induced enhancement factor of ΔG/P is smaller than that of $\rho_s$ because $\rho_s$ is affected by both $A_s$ and $A_m$ whereas the ΔG/P is determined by $A_s$ only. The loss suppression in Ag induces stronger absorption in InSb and this effect enhances photoresponsivity. Note that, even though the electron path length per unit length of the coil axis is a strong function of θ, the total electron path length is independent of θ because the strip length is fixed. Thus the resistance of the Ag nanowires, which accounts for electrical loss, is the same for all the structures while the optical loss suppression depends strongly on θ.

In the various embodiments of the invention, the metal nanowire electrode has terminal ends with a configuration that defines a non-linear path between the terminal ends. This allows for joule heating, also known as ohmic heating and resistive heating, by allowing for the passage of an electric current through the metal nanowire to release heat. Suitable path geometries that may be used in accordance with the invention include the helical arrays described above as well as serpentine, U-shaped, meandering and other configurations known to those of skill in the art.

Figure 5A:
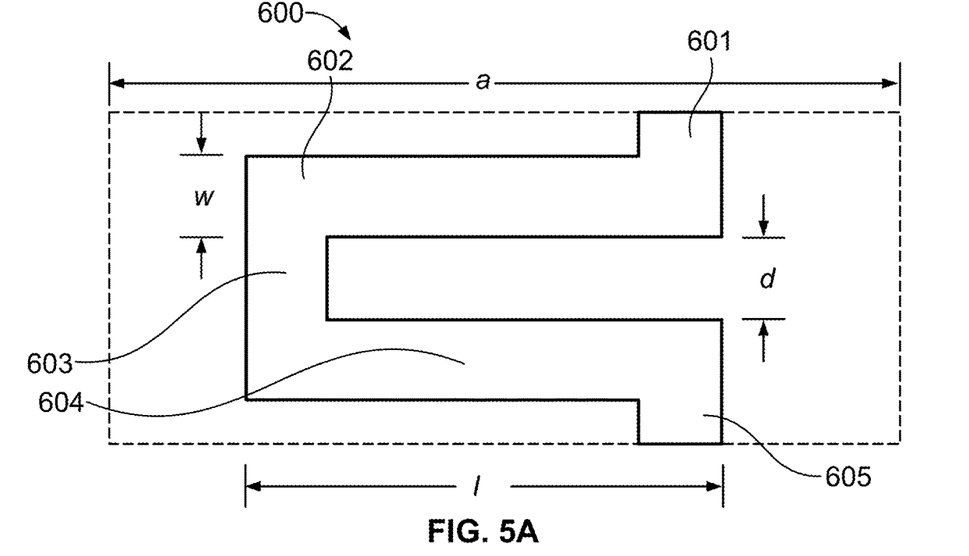
FIG. 5A is a top view of a serpentine unit for use as part of a metal nanostructure conductor.

One preferred embodiment that defines a non-linear path is a repeating unit cell 600 as shown in FIG. 5A. The unit cell 600 repeats in both horizontal and vertical directions with periodicities a and 2d+2w, respectively. Repeating unit cell 600 is comprised of linear segments 601 through 605 that may be connected at right angles. The conductor may form an aluminum nanowire or other suitable metals may be used as well. The cross-section is a square with a side w. The periodicity of the structure is small compared to the wavelength of light. Unpolarized light is normally incident from the top on the structures.

Figure 5B:
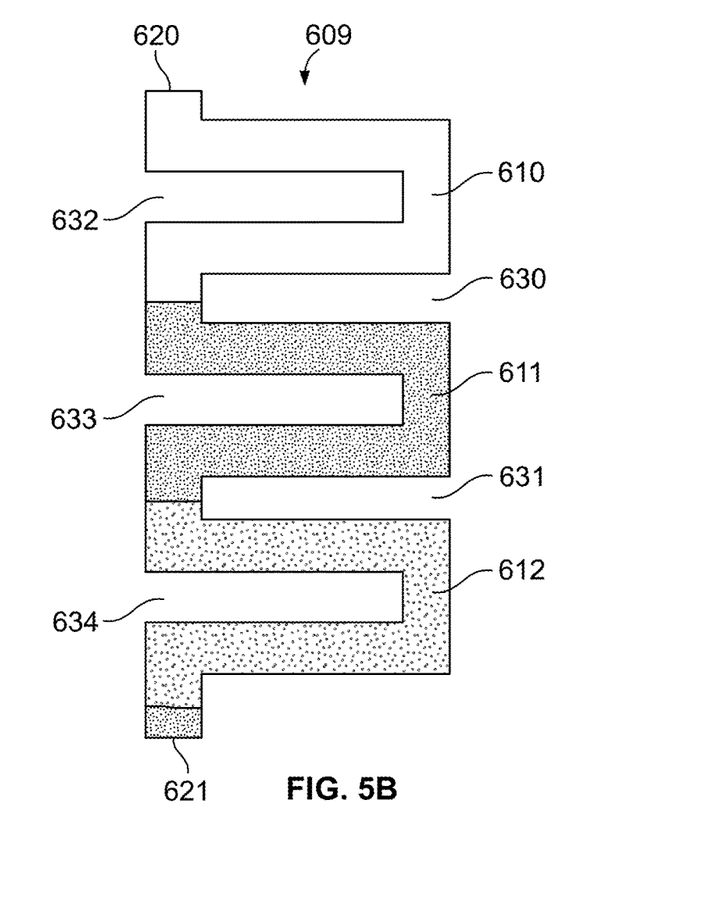
FIG. 5B is a top view of a serpentine metal conductor of one embodiment of the present invention.

As shown in FIG. 5B, conductor or wire 609 is formed by repeating units cells 610 through 612. Conductor or wire 609 has terminal ends 620 and 621 and the path between the terminal ends is not linear. Using the terminal ends, a current may be applied to the wire or conductor to generate heat.

The unit cells do not all need to be the same and can be of a wide variety of configurations; nor do the repeating units need to be the same. Opposingly located openings 630 through 634 are created by the non-linear path.

Another preferred embodiment that defines a non-linear path is to configure the metal wire as a coil. In other aspects, the coil is a helically coiled ribbon. Also, the coil may have a diameter equal to or less than 1 micron and a periodicity equal to or less than 1.5 microns. Lastly, the coil may have a winding angle equal to or less than 12 degrees.

As shown above, metal nanostructures can considerably suppress optical absorption in metals over a broad IR spectrum by increasing the Faraday inductance and the electron path length of the structures. For an array of coiled nanowires, and the other non-linear configurations discussed above, the significant loss reduction results in extreme optical transparency. This property can be used for various optical applications such as IR transparent windows or lenses which are self-defrosting/de-icing. When these windows or lenses are frosted in cold weather, the metal nanostructures embedded in the IR glass can be resistively heated to remove the frost while maintaining the transparency of the window.

In one embodiment, the nanostructures may be sandwiched in-between the transparent material to form a composite. In addition, the nanostructures may be located in channels formed in the transparent material.

While the foregoing written description enables one of ordinary skill to make and use what is considered presently to be the best mode thereof, those of ordinary skill will understand and appreciate the existence of variations, combinations, and equivalents of the specific embodiment, method, and examples herein. The disclosure should therefore not be limited by the above described embodiments, methods, and examples, but by all embodiments and methods within the scope and spirit of the disclosure.

What is claimed is:

1. A self-defrosting/de-icing window comprising:
   a plurality of nanowires disposed throughout the window; and
   said plurality of nono wires resistively heated; and
   said plurality of nano wires are formed into non-intersecting, non-linear paths that render said plurality of nano wires optically transparent.

2. The device of claim 1 wherein optical transparency is maintained up to an incidence angle of at least 60°.

3. The device of claim 1 wherein the non-linear path is a coiled path and the coiled path renders a plurality of said wires optically transparent.

4. The device of claim 1 wherein the non-linear path is a serpentine path that renders a plurality of said wires optically transparent.

5. The device of claim 4 wherein said serpentine path is U-shaped.

6. A transparent material configured to operate at an electromagnetic radiation frequency comprising:
   at least one metal wire;
   said metal wire in a non-linear configuration, said non-linear metal wire having an effective plasma frequency that is equal to or lower than the electromagnetic frequency;
   said at least one metal wire resistively heated and is optically transparent at the electromagnetic radiation frequency; and
   said metal wire is configured as a coil.

7. The device of claim 6 wherein said coil is a helically coiled ribbon.

8. The device of claim 6 wherein said coil has a diameter equal to or less than 1 micron and a periodicity equal to or less than 1.5 microns.

9. The device of claim 6 wherein said coil has a winding angle equal to or less than 12 degrees.

10. An optoelectronic device having a self-defrosting/de-icing window comprising:
    at least one metal wire having a first terminal end and a second terminal end and defining a path between said terminal ends;
    said path is configured as a non-linear path that decreases the effective conductivity of said metal wire as compared to a linear path between said terminal ends; and
    said at least one metal wire resistively heated and is optically transparent at the electromagnetic radiation frequency.

11. The device of claim 10 wherein said path is serpentine.

12. The device of claim 11 wherein said serpentine path is U-shaped.

13. The device of claim 11 wherein said serpentine path is comprised of linear segments.

14. The device of claim 13 wherein said linear segments are connected at right angles.

15. The device of claim 6 wherein optical transparency is maintained up to an incidence angle of at least 60°.

16. The device of claim 10 wherein optical transparency is maintained up to an incidence angle of at least 60°.

17. The device of claim 1 wherein the electronic movement in the direction of the z-axis is retarded by the geometry of the non-linear path because a portion of the non-linear path is not aligned along the z direction.

18. The device of claim 6 wherein the electronic movement in the direction of the z-axis is retarded by the geometry of the non-linear path because a portion of the non-linear path is not aligned along the z direction.

19. The device of claim 10 wherein the electronic movement in the direction of the z-axis is retarded by the geometry of the non-linear path because a portion of the non-linear path is not aligned along the z direction.

\* \* \* \* \*